United States Patent [19]

Steig

[11] 4,138,533
[45] Feb. 6, 1979

[54] LEAD ACCUMULATOR

[76] Inventor: Hans Steig, Hauptlinderweg 7, 4770 Soest, Fed. Rep. of Germany

[21] Appl. No.: 794,223

[22] Filed: May 5, 1977

[30] Foreign Application Priority Data

May 14, 1976 [DE] Fed. Rep. of Germany ....... 2621381

[51] Int. Cl.² ............................................. H01M 2/28
[52] U.S. Cl. ..................................... 429/161; 429/211
[58] Field of Search ............... 429/161, 160, 245, 208, 429/211, 186

[56] References Cited

U.S. PATENT DOCUMENTS

| 1,240,280 | 9/1917 | Wilson | 429/161 |
| 1,259,193 | 3/1918 | Ahlgren | 429/161 |
| 3,764,386 | 10/1973 | Mix | 429/161 |
| 3,884,716 | 5/1975 | Walker | 429/245 |
| 3,914,134 | 10/1975 | Carson | 429/160 |

Primary Examiner—Donald L. Walton
Attorney, Agent, or Firm—Salter & Michaelson

[57] ABSTRACT

A lead accumulator is of the tall constructional kind for use in, for example, stacking or fork-lift trucks, submarines or power stations. To achieve satisfactory current and voltage characteristics for high electrode plates and for production purposes, the plates are formed with current lugs along their side edges. The current lugs of plates of the same polarity are electrically and mechanically connected together by a pole plate of high electrical conductivity extending along the side edges of the electrode plates.

7 Claims, 3 Drawing Figures

LEAD ACCUMULATOR

This invention relates to lead accumulators of tall constructional type having plate electrodes standing vertically and mechanically and electrically connected together.

In many applications, for example in electric stacking trucks, in submarines, for peak load adjustment in power stations, and the like, there is only limited ground space available for the installation of lead accumulators. As a result accumulator cells are installed in which the height of the plates is two or three times the normal value. In such cases the plates are preferably arranged vertically since only thus can an optimal discharge of gases and unimpeded falling off of loose particles be obtained.

A disadvantage of this type of accumulator arises from the considerable height of the plates. The current increases linearly from the base of the plate to the current conductor mounted at the top, whereas, with constant cross-section, the voltage drop in the negative and positive plates increases quadratically. This leads to considerable electrical losses with the undesired results of a variable current density on the surface of the plate, too fast and non-uniform heating of the cell, and, in particular, to the disadvantage that with discharges over a short period the starting voltages and the available energies per battery weight, i.e. the weight specific energies, are low in comparison with those of accumulators of normal plate height.

In German Patent Application No. P2,132,690.9 there is proposed an arrangement to remove these disadvantages in that the plate electrodes are divided into vertical sections in order thus to re-establish a normal plate height. The individual sections of the plate each have current lugs on their upper side edges, the current lugs of the plates making up a group of sectional plates being joined together by means of a copper lead encased in lead. The copper lead is connected to copper bars encased in lead, which surround the group of sectional plates as a framework and which are connected to the poles of the cell. As a result the plate sections of normal height which make up the group are connected in parallel.

However, the disadvantages of this proposal are obvious. The division of the height of the plate into sections and the expensive interconnection of the groups of sectional plates thus produced do not result in any significant economy in weight, so that the weight specific energies in the short period range are not increased significantly, while in the long period range a worsening of the weight specific energies is to be anticipated as more likely. Moreover, the expensive interconnection of the group of sectional plates entails a production cost which is not only unfavourable but which also runs counter to attempts to fully automate the manufacture of accumulators.

An object of the invention is to design a lead accumulator of tall constructional type with improved properties in the short period range which is simple in terms of manufacturing technique and which can therefore be manufactured with favourable costs.

According to the invention a lead accumulator of tall constructional form comprises plate electrodes, current lugs on the vertical side edges of the plate electrodes, each electrode having at least two current lugs and the current lugs being spaced from one another, and a pole plate constituting a current conductor of high electrical conductivity mechanically and electrically connecting together the current lugs of plate electrodes of the same polarity and arranged along the side edges of the plate electrodes.

It is advantageous to match the breadth of the pole plate to that of the group of plates of an accumulator cell. However, small pole plates can also be considered. Lead accumulators can be constructed which, for example, have only a negative pole plate. As a rule, however, a negative and a positive pole plate are arranged, in each case, on opposite sides of the group of plates. It is also possible to clamp two groups of plates of high format together within a cell by means of a centrally arranged pole plate, and, in this case, a negative pole plate is present on each of the externally situated sides of the group of plates.

From the point of view of manufacturing technique the group of plates which includes the pole plates is extremely simple to produce. The plate electrodes are brought together with the separators in the usual way and are stacked. A pole plate is then brought into engagement with the current lug on each side. The mechanical and electrical interconnection of the current lugs and the pole plate may be brought about by, for example, resistance welding. In another possibility the pole plate is provided with openings or slits which correspond in cross-section with the current lugs. In this case the group of plates is already locked together as a unit by the mechanical pushing of the lateral pole plates onto the current lugs and can then easily be lifted up and turned in order to weld or solder the current lugs to the pole plate.

It is advantageous to insulate the sides of the plate electrodes relative to the pole plate of opposite polarity. This is conveniently achieved by welding the separators to foil which covers one of the sides of the plate electrodes.

The pole plates are conveniently connected together above the group of plates by means of a single pole or if desired, for the purpose of increasing the contact surface, with a number of single poles. In this case the pole plate may extend upwards to immediately below the cover of the cell or it may, on the other hand, extend only slightly above the group of plates in which case the single pole with a correspondingly large conductive cross-section should be led to the pole plate.

The starting voltage and the available energies per battery weight are markedly improved in the accumulator cell according to the invention. Among other reasons this may be due to the lateral arrangement of the lugs and their distribution over the height of the plates. The separation between the lateral current lugs may, in this case, vary with the distance from the base of the plate in such a way that a uniform distribution of current over the plate surface is produced continuously. The lateral pole plates, in spite of their high conductive cross-section, take up only a small space and they consist of a material which has a conductivity significantly higher than that of lead. Outstanding results, particularly in respect of the weight specific energies for short period discharges, were obtained with a pole plate of electrolytic copper or an alloy containing at least 90% copper, which is provided with a coating of lead and tin containing 0.1 to 50% tin (preferably 5 to 15% tin). Equally good results were obtained with a pole plate of electrolytic copper or an alloy containing at least 90% copper which is protected by layer of iron 2 to 20$\mu$ (preferably 5μ) thick, a lead and tin hot tinning and a sealing layer of lead 2 to 5 mm (preferbly 2 to 3 mm) thick. Pole plates of electrolytically lead-coated aluminium or aluminium alloy also produced good results, but they require rather more space due to their relatively greater volume.

An embodiment of the invention is now described by way of example and reference to the drawings, in which.

Figure 1:
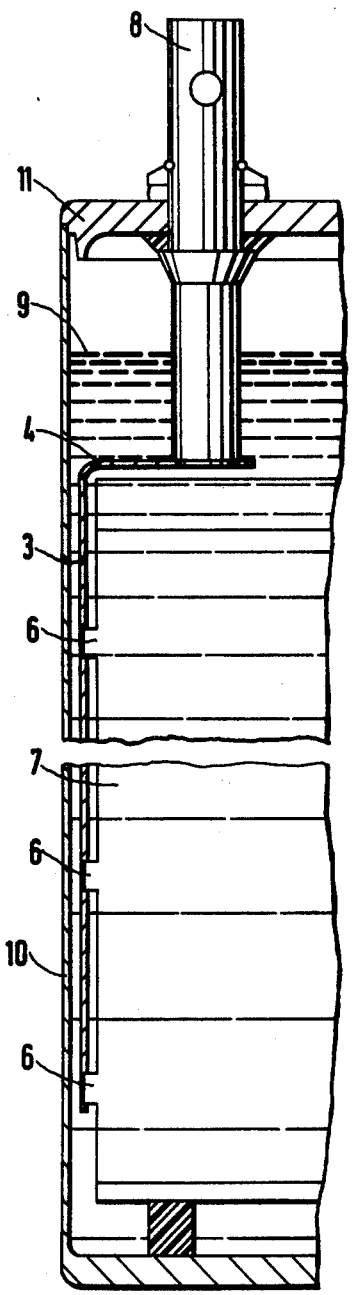
FIG. 1 is a cross-section through the edge region of an accumulator cell of tall format.
Figure 2:
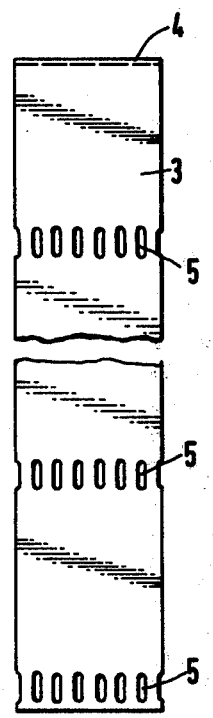
FIG. 2 is a side view of pole plates used in the cell of FIG. 1.

Referring first to FIG. 2, the construction of a pole plate 3, particularly favourable from the point of view of manufacturing technique, is illustrated. The pole plate 3 is stamped from plate material and is bent over in its upper region 4. Slits 5 are also formed during the stamping process and correspond in shape and in their position with current lugs 6 formed on the plates 7 of the cell (FIG. 1).

In the next manufacturing step the pole plate according to FIG. 2 is connected to the single pole 8 according to FIG. 1 by hard soldering or otherwise. For high current loads the pole 8 may consist of the same material as the pole plate 3 and it is then protected by layers of a lead and tin alloy, preferably deposited electrolytically, or otherwise. The pole may also be protected in the region of the acid level, which is indicated by line 9, by means of a shrink tube covered with a layer of a sealing material or with a layer of lead.

In the illustrated embodiment the prefabricated pole plate is pushed on to the current lugs 6 of the stacked group of plates 7. The group of plates can then be manipulated as a compact unit so that secure electrical connection between the current lugs 6 and the pole plate 3 can easily be produced by welding or soldering or by another suitable method.

The finished group of plates is then mounted in the battery container 10, whereupon the battery container is closed by means of the lid 11, the points at which the single poles 8 pass through the lid being sealed.

Figure 3:
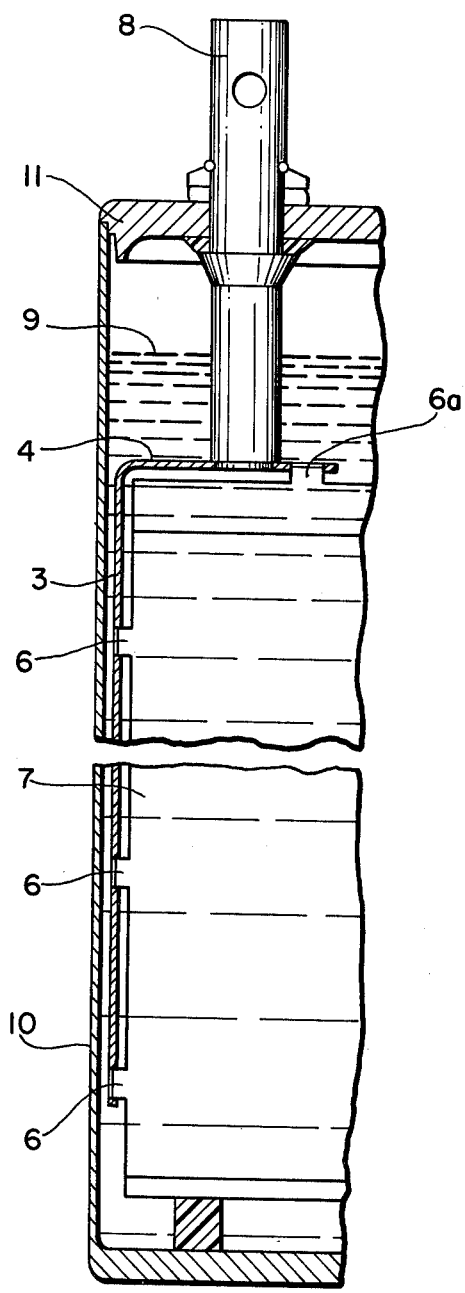
FIG. 3 is a cross-section through the edge region of another embodiment of an accumulator cell of tall format.

Another embodiment of the invention shown in FIG. 3 offers advantages in particular from the point of view of manufacturing technique. It includes a plurality of parallel disposed plate electrodes 3. Each plate electrode includes current lugs 6 on its vertical side edge and also at least one current lug 6a on its horizontal upper side edge. The pole plate which is bent over in its upper region, 4 as shown in FIG. 3, is connected mechanically and electrically both with the current lugs on the vertical side edge of the plate electrode and also with that on the horizontal side edge of the electrode thus providing an exceptionally good support for the electrode as well as simplifying manipulation in the finishing process. This is particularly useful for embodiments of the invention in which the current lugs engage in corresponding openings in the pole plate. The pole plate which deflects elastically in the upper bent-over region is, in this case, clamped sufficiently firmly to the plate electrode by the mechanical pushing on to the current lugs on the mutually perpendicular side edge of the electrode to permit the further finishing processes to be carried out more easily on the group of plates clamped in this way and thus with more favourable costs.

What we claim as our invention and desire to secure by Letters Patent of the United States is:

1. In a lead accumulator of tall constructional form comprising plate electrodes, each electrode having current lugs on the side edges of the plate and current lugs being spaced from one another, and a pole plate constituting a current conductor of high electrical conductivity mechanically and electrically connecting together the current lugs of the plate electrodes of the same polarity and arranged along the side edges of the plate electrodes, the improvement comprising said plate electrodes having current lugs on two adjacently positioned side edges of each plate and said pole plate shaped to closely conform to the configuration of said adjacent side edges, said pole plate provided with openings which generally correspond in cross-section with said current lugs, said lugs being mechanically received in said openings and electrically connected to said pole plate.

2. The lead accumulator according to claim 1 wherein said plate electrodes are rectangular and have at least two current lugs on one side edge and at lease one current lugs on the other side edge, the pole plate being formed of a material which deflects elastically whereby the pole plate is firmly mechanically clamped to the plate electrodes by the receipt of the current lugs in said pole plate openings.

3. The lead accumulator according to claim 2, said one side edge being vertically orientated and said other side edge being horizontally orientated and connected to a single conductive pole.

4. The lead accumulator according to claim 1, wherein said electrical connection between the current lugs and the pole plate is secured by welding.

5. The lead accumulator according to claim 1, wherein said electrical connection between the current lugs and the pole plate is secured by soldering.

6. The lead accumulator according to claim 1, said pole plate formed of electrolytic copper, or an alloy containing at least 90% copper, and has a coating of lead and tin with 0.1–50% tin, preferably 5–15% tin.

7. The lead accumulator according to claim 1, said pole plate formed of electrolytic copper, or an alloy containing at least 90% copper, and is protected by a layer of iron 2–20 thick, preferably 5 thick, a lead and tin hot tinning, and a sealing layer of lead 2–3 mm thick.

* * * * *